D. N. B. COFFIN, Jr.
Screws for Imparting Motion to Machinery.

No. 150,136. Patented April 28, 1874.

Witnesses.  Inventor.

UNITED STATES PATENT OFFICE.

DAVID N. B. COFFIN, JR., OF NEWTON, MASSACHUSETTS.

IMPROVEMENT IN SCREWS FOR IMPARTING MOTION TO MACHINERY.

Specification forming part of Letters Patent No. 150,136, dated April 28, 1874; application filed February 5, 1874.

*To all whom it may concern:*

Be it known that I, DAVID N. B. COFFIN, Jr., of Newton, in the county of Middlesex and State of Massachusetts, have invented an Improvement in Screws for Imparting Motion to Machinery, of which the following is a specification:

The invention is illustrated in the accompanying drawings, of which—

Figure 1:
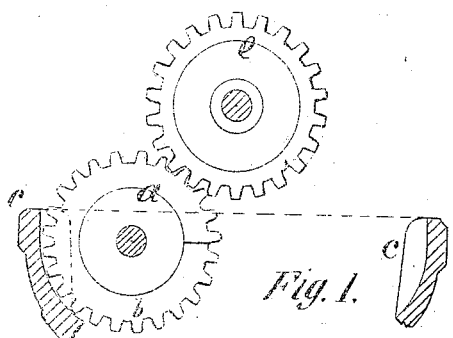
Figures 2, 6, 7:
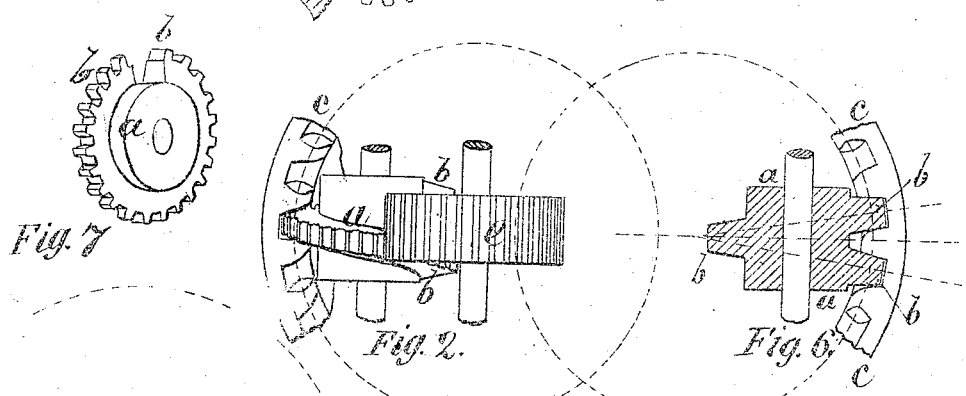
Figure 3:
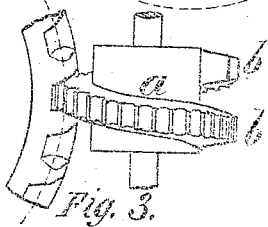
Figure 5:
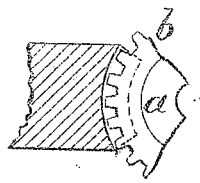
Figure 4:
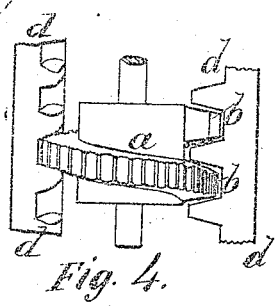

Figure 1 shows an end view of the screw; *a b* an end view of the impelling-gear *e*, and section of an internal annular nut or worm-gear, *c*. Fig. 2 is a plan of the same parts. Fig. 3 is a plan of a worm, *a b*, and an externally-toothed worm-gear or nut-wheel or segment, *c*. Fig. 4 is a plan of a worm and two forms of a rack-nut, *d*. Fig. 5 shows the worm or screws of Fig. 1, provided with nut of a uniform construction, and adapted for either external or internal arrangement or a rack. Fig. 6 is a sectional view, illustrating the construction of the improved screw adapted to an internal nut-wheel. Fig. 7 is a perspective view of one of the improved screws.

The peculiar construction of the thread of the improved screw is illustrated in Fig. 6, the form thereof being such that any section taken transversely to the spiral direction of the thread around its axis, and through that The gear is provided with a face broad enough to mesh into at least one entire revolution of the screw-thread.

Ordinary linear worms may be used for the externally-toothed nut-wheel or the rack-nut, shown in Fig. 4.

The internally-toothed worm-gear or nut-wheel is susceptible of and should have such a construction or form of teeth that the screw-thread above described will so nearly fit the teeth or nut as to be approximately equal in point of fair bearing and wearing surfaces to an ordinary or linear screw and nut. As I do not know of a better way in which to describe this form of tooth or nut intelligibly to the ordinary mechanic or skilled workman, I will describe it as that form or construction of tooth or nut which would be produced by the use of a milling-tool or cutter, having the same form as the above-described screw and thread.

I claim—

1. The complex or toothed screw, substantially as described.

2. The toothed screw, in combination with the impelling gear-wheel *e*, substantially as described.

3. The combination of the toothed screw with the internal or external nut-wheel or worm-gear or rack, substantially as described.

4. The combination of the toothed screw